United States Patent [19]

Nakamura

[11] Patent Number: 5,036,368
[45] Date of Patent: Jul. 30, 1991

[54] ELECTROMAGNETIC COUPLING DEVICE

[75] Inventor: Hiroaki Nakamura, Ise, Japan

[73] Assignee: Shinko Denki Kabushiki Kaisha, Tokyo, Japan

[21] Appl. No.: 625,428

[22] Filed: Dec. 11, 1990

[51] Int. Cl.$^5$ .................. H01H 7/08; H01H 7/14; F16D 19/00

[52] U.S. Cl. .................. 335/272; 335/220; 335/289; 310/103; 192/84 C

[58] Field of Search .............. 335/288, 289, 272, 271, 335/270, 220, 221; 310/103, 104; 192/84 B, 84 C, 84 A

[56] References Cited

U.S. PATENT DOCUMENTS 2,982,385  5/1961  Gamundi ..................... 192/84 B
4,432,446  2/1984  Okano et al. .................. 335/289

Primary Examiner—Harold Broome
Attorney, Agent, or Firm—Oblon, Spivak, McClelland, Maier & Neustadt

[57] ABSTRACT

An electromagnetic coupling device is proposed to obviate drawbacks in the conventional coupling devices, namely, expensive production cost brought about by such step as caulking with rivet or by screw setting in making armature and spring assembly. The proposed electromagnetic coupling devices uses an armature and spring assembly which composed of a ring shaped flat spring formed with a plurality of axially extending protrusions instead of a leaf spring, and an armature having a radially extending projections for effecting spring action to the armature. The ring shaped flat spring in the modified armature/spring assembly can be fabricated with less production cost and can be readily fitted to to the armature with less man hours, thereby the production cost can be remarkably reduced.

3 Claims, 3 Drawing Sheets

ELECTROMAGNETIC COUPLING DEVICE

BACKGROUND OF THE INVENTION

1. Field of the Invention

The present invention relates to an improvement in an electromagnetic coupling device. In more detail, the present invention relates to an electromagnetic coupling device comprising, an input shaft hub, an output shaft hub, an electro-magnet disposed at the side of the input shaft hub, an armature attached through a spline coupling means to the output shaft hub so as to be kept spaced apart from the input shaft hub at a predetermined gap when the electro-magnet is not excited, and a ring shaped flat spring which normally urges the armature toward the output shaft hub.

2. Description of the Prior Art

Heretofore, there has been proposed, for example, an electromagnetic coupling device having a structure as shown in FIG. 1, which comprises, an input shaft hub 1, an output shaft hub 2, an electro-magnet 3 disposed at the side where said input shaft hub 1 is mounted, an armature 6 attached through a spline coupling 5 to the output shaft hub 2 which is normally urged by a leaf spring 4 so as to be spaced apart from the input shaft hub 1 at a predetermined gap g when the electro-magnet is not excited, whereby the electro-magnet 3, when excited, can attract the armature 6 toward the input shaft hub 1 against the spring force imparted by the spring 4 so that a torque given by the input shaft hub 1 can be transmitted by the spline coupling 5 to the output shaft hub 2.

In the conventional electromagnetic coupling device shown in FIG. 1, it is required for such coupling device for effecting axial displacement of the armature 6 by means of a spring action given by the leaf spring 4, that both the spring 4 and the armature 6 must be joined together by either one of the following means as mentioned below, 1) caulking with rivet or rivets, or
2) screw setting with screw or screws.

However, the caulking work according to the item 1) requires drilling of the armature to form a through hole or holes and subsequent rivetting work, while the screw setting according to the item 2) requires machining for making both screws and tapped hole(s) in an armature piece, in addition, troublesome assembly of these related parts is also required.

SUMMARY OF THE INVENTION

In view of the above-mentioned drawbacks in the prior art electromagnetic clutch, the present invention aims to obviate aforesaid drawbacks.

Consequently, an object of the present invention is to provide an electromagnetic clutch having an improved structure in armature and spring assembly.

In other words, according to the present invention a ring shaped flat spring is used as a substitute for the leaf spring of aforesaid coupling device.

The ring shaped flat spring according to the present invention is formed generally as a flat ring having a plurality of axially bent protrusions formed along the inner periphery of the ring of the spring piece, so that in time of assembly the bent portions can be readily fitted into an annular groove formed around the outer periphery of the output shaft hub.

Moreover, when the flat spring and the armature are assembled to the output shaft hub, intermediate flat portions of the spring each of which bridging aforesaid two adjacent bent protrusions, are made engageable, at their side face opposite to that having the aforesaid protrusions, with each side face of a plurality of radially and inwardly extending projections of the armature.

And the positions at which the projections are brought into contact with the side face of the flat spring, are substantially the middle part of each of the intermediate portions extending between two adjacent axially bent protrusions of the flat spring.

BRIEF DESCRIPTIOPN OF THE DRAWINGS

DETAILED DESCRIPTION OF THE PREFERRED EMBODIMENT

A preferred embodiment of the present invention will now be described with reference to the accompanying drawings.

Figure 1:
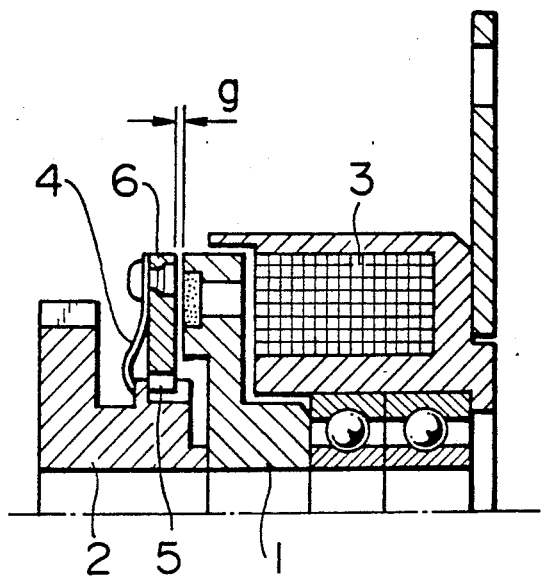
FIG. 1 is a half cut sectional front view of a conventional electromagnetic coupling device.

Throughout the FIGS. 1,2,3A,3B,3C,3D,4A,4B and 4C, the parts or components the same as or similar to those of the conventional device shown in FIG. 1 are designated by the same reference numerals and the detailed description thereof will not be repeated.

Figure 2:
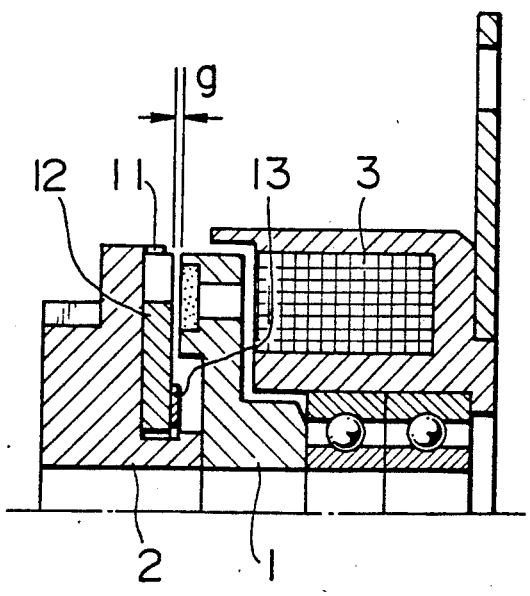
FIG. 2 is a half cut front view of a preferred embodiment of the electromagnetic coupling device of the present invention.
Figure 4A:
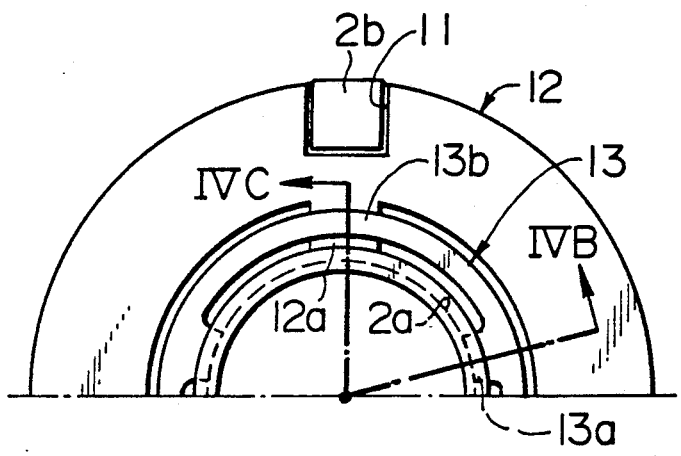
FIG. 4A is a half-cut side view of a preferred embodiment of the present invention.
Figure 4B:
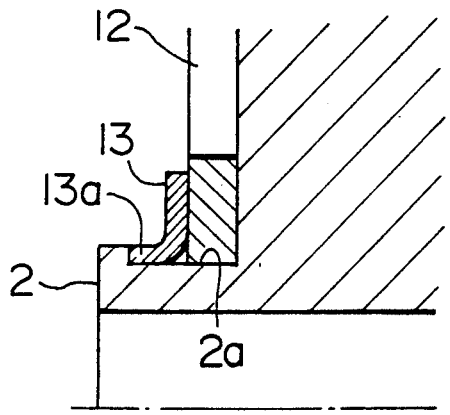
FIG. 4B is an enlarged partial cross sectional front view taken along line IVB of FIG. 4A and showing the one axial end portion of the output shaft hub and the armature.
Figure 4C:
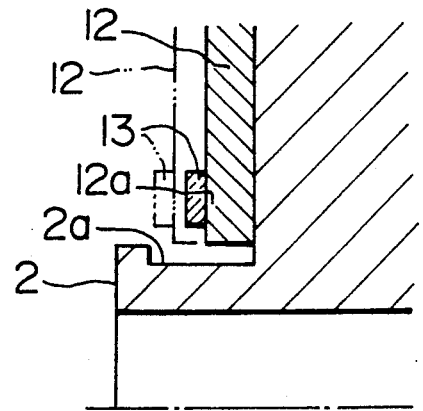
FIG. 4C is an enlarged partial front view taken along line IVC of FIG. 4A showing the axial end portion of the output shaft hub and the armature.

The electromagnetic coupling device, hereinafter merely referred to as an electromagnetic clutch comprises, as shown in FIG. 2 and FIG. 4C, an input shaft hub 1, an output shaft hub 2, an electro-magnet 3 disposed at the side where the input shaft hub 1 is mounted, an armature 12 disposed being spaced apart from the input shaft hub 1 with a gap g of predetermined extent and is further attached to the output shaft hub 2 through a spline coupling 11 and 2b and a ring shaped flat spring 13.

Figure 3A:
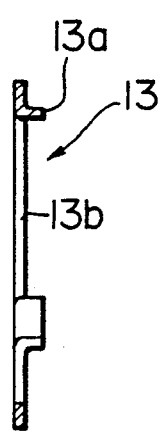
FIG. 3A is a sectional side view of a ring shaped flat spring taken along line IIIA of FIG. 3B.
Figure 3B:
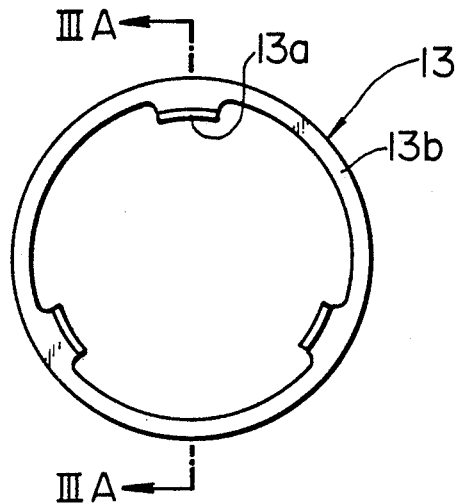
FIG. 3B is a front view of the ring shaped flat spring.
Figure 3C:
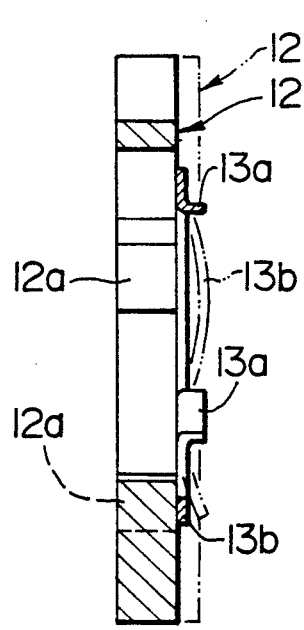
FIG. 3C is a sectional side view, taken along line IIIC of FIG. 3D and showing the relative position of the projections of the armature, flat ring portions and bent portions of the flat spring, when the armature is not attracted by the electro-magnet.
Figure 3D:
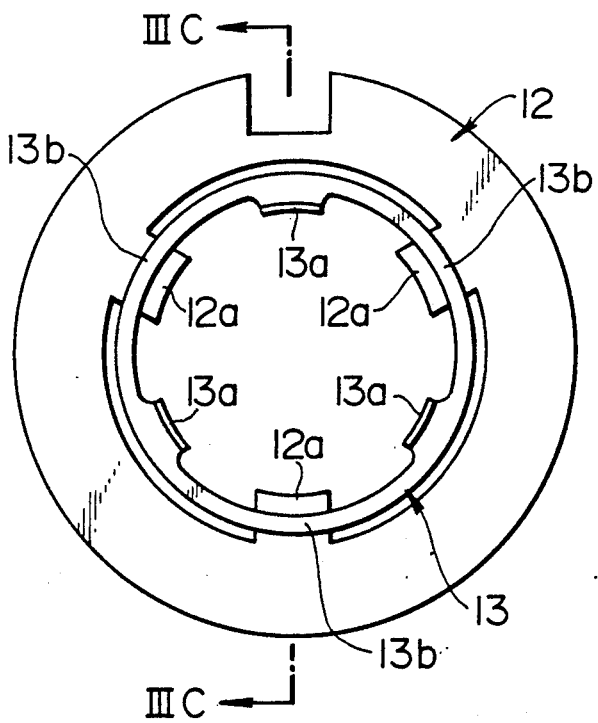
FIG. 3D is a sectional front view showing the relative position of the projections of the armature, flat ring portions and bent protrusions of the flat spring, when the armature is attracted.

The ring shaped flat spring 13 is formed, as shown in FIGS. 3A and 3B, to have three axially bent protrusions 13a like three short feet along the inner periphery of the flat ring portions 13b.

In assembling the output shaft hub assembly, at first, the armature 12 is attached concentrically and in a correct position relative to the output shaft hub 2, then the flat spring 13 is assembled onto the side face of the armature 12 by axially depressing the flat spring 13 against the armature 12 so that the bent protrusions 13a are direced opposite to the already attached armature 12 and these three bent protrusions 13a can be fixedly fitted into the annular groove 2a formed around the outer surface of the output shaft hub 2.

In the thus assembled state, the radially extending three projections 12a of the armature 12 abut on each of the three intermediate portions 13b bridging each two adjacent bent portions 13a of the flat spring 13 at their substantially middle part.

Next, explanation will be made in what manner the ring shaped flat spring 13 imparts spring action under the attracting force exerted by the electro-magnet 3.

Referring to FIG. 4B and 4C, the flat spring 13 is fitted into the annular groove 2a as explained above, with its three bent protrusions 13a being snugly in contact with both the inner side wall and the bottom face of the annular groove 2a, so that these bent protrusions 13a themselves are able to withstand against any external force acting to axially move these bent protrusins toward the input shaft hub.

On the other hand, the other side face (left side face in FIG. 3C) of the flat portion 13b of the spring 13 having no bent protrusions engages, at each of their three intermediate portions, with each side face of the radially extending projections 12a of the armature 12.

Under this condition no appreciable extent of deflection is observed at the flat intermediate portion 13b, but the flat spring 13 is fabricated to have a shape able to normally exert some extent of spring force sufficient to urge the armature 12 toward the output shaft hub 2 while being spaced apart from the input shaft hub 1 at a gap of predetermined extent g, if the electro-magnet 3 is not excited.

In operation, the armature 12 is normally biased as explained above by a ring shaped flat spring 13 toward the output shaft hub 2, however, once the electromagnet 3 is excited, the armature 12 is axially attracted by the electro-magnet 3 through the spline coupling (2b and 11) toward the input shaft hub 1 and becomes integral with the input shaft hub, thus the torque imparted by the input shaft hub 1 can be transmitted to the output shaft hub 2 through the spline coupling means which enables both the axial displacement of the armature 12 alone and the rotation of the same integral with the output shaft hub 2.

By virtue of the combined structure of the ring shaped flat spring and the armature formed with a plurality of radially extending projections, both of them are simple in shape and readily facricable, electro-magnetic coupling device of this invention can be fixedly assembled by merely depressing the ring shaped flat spring into the annular groove formed on the outer surface of the output shaft hub, and thereby can reduce the cost of production of the clutch means with respect to both for parts making and for assembly.

In the above preferred embodiment, the ring shaped flat spring 13 is shown and explained as having three axially bent protrusions at one side face coacting with three radially extending projections of the armature.

With regard to the number of axially bent protrusions, it goes without saying that such protrusions are not required to be three, but protrusions in other adequate number, say 4 to 10, may be selected depend on the size of the eletromagnetic coupling device and the material to be used for the spring.

What is claimed is:

1. An electromagnetic coupling device comprising: an input shaft hub, an output shaft hub, an electro-magnet disposed at the side of said input shaft hub, a ring shaped armature disposed around the outer surface of said output shaft hub and axially between said input shaft hub and said output shaft hub and is coupled to said output shaft hub through a spline coupling means so as to be axially movable relative to said output shaft hub and rotatable integral with said output shaft hub, a spring which normally urges said armature so as to be kept spaced apart from said input shaft hub with a gap of predetermined extent and allows said armature to be attracted toward said input shaft against its spring force; wherein, said ring shaped armature is formed to have a plurality of radially and inwardly directed projections extending from the inner periphery, said output shaft hub is formed to have an annular groove around its outer periphery, and said spring is a ring shaped flat spring having, a plurality of axially bent protrusions formed along the inner periphery and is able to be fitted into said annular groove of said output shaft hub, and a plurality of intermediate flat portions of the spring bridging each two adjacent protrusions capable of being engaged with each of said radially extending projections of said armature so as to be urged by said projections toward said input shaft hub to effect spring action to said armature either when said electro-magnet is excited or not.

2. An electromagnetic coupling device as claimed in claim 1; wherein said ring shaped flat spring is formed to have 3 axially bent protrusions and said ring shaped armature is formed to have three radially and inwardly directed projections extending from the inner periphery and is positioned so as to be engaged with the middle part of the intermediate portion bridging said axially bent protrusions, when said armature and said ring shaped flat spring is assembled to said output shaft hub.

3. An electromagnetic coupling device as claimed in claim 1, wherein said ring shaped flat spring is formed to have axially bent 4 to 10 protrusions and said armature is formed to have the same number of radially and inwardly extending projections as that of said axially bent protrusions.

* * * * *